United States Patent Office 3,092,636
Patented June 4, 1963

3,092,636
α-[2-(1 - ALKYLENEIMINO)ETHYLAMINO] - ALKANOPHENONES AND THE CORRESPONDING ALCOHOLS
Richard V. Heinzelman, Kalamazoo Township, Kalamazoo County, and Brooke D. Aspergren, Kalamazoo, Mich., assignors to The Upjohn Company, Kalamazoo, Mich., a corporation of Delaware
No Drawing. Filed Oct. 21, 1959, Ser. No. 847,682
9 Claims. (Cl. 260—326.5)

This invention pertains to novel organic compounds, and more particularly it pertains to α-{1-[2-(1-alkyleneimino)ethylamino]alkyl} derivatives of protocatechuyl alcohol, and to a process for preparing the same.

The compounds of the invention have, in their free base form, the following general structural formula:

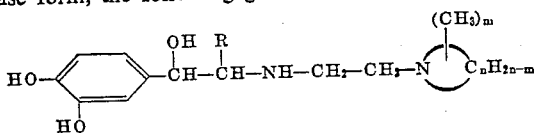

wherein R is hydrogen or a lower-alkyl radical containing from 1 to 4 carbon atoms, inclusive, for example, methyl, ethyl, propyl, butyl, isobutyl, and the like; $n$ represents an integer from 4 to 6, inclusive; and $m$ represents an integer from 0 to 2, inclusive.

The novel α-{1-[2-(1-alkyleneimino)ethylamino]alkyl} protocatechuyl alcohols of the invention (Formula I above) possess sympathomimetic activity and lack pressor activity. The compounds are bronchodilators and can be administered to mammals for the treatment of bronchial spasms, e.g., asthma. The compounds also are active as uterine relaxants and can be used in the treatment of dysmenorrhea and threatened abortion, and in the prevention of premature labor.

The compounds of this invention can be prepared by various methods. A general procedure involves halogenating 3,4-dihydroxyalkanophenone, preferably after preliminary benzylation, to give 3,4-dibenzyloxy-α-haloalkanophenone; substituting a 2-(1-alkyleneimino)ethylamino group for the halogen; neutralizing the α-[2-(1-alkyleneimino)ethylamino] - 3,4 - dibenzyloxyalkanophenone free base thus formed with acid; and then reducing and debenzylating the α-[2-(1-alkyleneimino)-ethylamino]-3,4-dibenzyloxyalkanophenone acid addition salt thus formed to α-{1-[2-(1-alkyleneimino)ethylamino]alkyl}protocatechuyl alcohol acid addition salt.

Halogenation of a 3,4-dibenzyloxyalkanophenone can be accomplished by direct halogenation. For example, 3,4-dibenzyloxy-α-haloalkanophenone is obtained by reacting 3,4-dibenzyloxyalkanophenone with chlorine or bromine. Illustratively, 3,4 - dibenzyloxypropiophenone or 3,4-dibenzyloxybutyrophenone is dissolved in a suitable solvent, for example, methylene chloride, benzene, chloroform, dimethylformamide, and the like, and reacted with bromine in the presence of an acid acceptor such as the salt of a weak base and weak acid (e.g., calcium carbonate, sodium carbonate, and the like) or a tertiary amine base (e.g., pyridine, triethylamine, and the like), to produce 3,4-dibenzyloxy-α-bromopropiophenone and 3,4-dibenzyloxy-α-bromobutyrophenone, respectively.

The substitution of the 2-(1-alkyleneimino)ethylamino group for the α-halogen of the 3,4-dibenzyloxy-α-haloalkanophenone is conveniently accomplished by dissolving the 3,4-dibenzyloxy-α-haloalkanophenone in an inert organic solvent, for example, benzene, toluene, tetrahydrofuran, ether, ethanol, and the like, and reacting it with 2-(1-alkyleneimino)ethylamine. When an acid acceptor, for example, sodium carbonate or potassium carbonate, is included in the reaction mixture, it is preferred to employ substantially equimolar amounts of 3,4-dibenzyloxy - α - haloalkanophenone and 2 - (1 - alkyleneimino)ethylamine. When an acid acceptor is not included, it is preferred to employ at least 2 moles of 2-(1-alkyleneimino)ethylamine per mole of 3,4-dibenzyloxy-α-haloalkanophenone. The reaction can be carried out at temperatures ranging from about —25° to about 100° C., preferably from about 0° to about 75° C. The resulting α - [2 - (1 - alkyleneimino)ethylamino] - 3,4-dibenzyloxyalkanophenone can be recovered in the free base form by conventional methods of separation, but it is preferable to neutralize the reaction mixture with acid and thus obtain an acid addition salt for use in the subsequent reduction and debenzylation.

Reduction and debenzylation of the α-[2-(1-alkyleneimino)ethylamino]-3,4-dibenzyloxyalkanophenone acid addition salt to the corresponding acid addition salt of α - {1 - [2 - (1 - alkyleneimino)ethylamino]alkyl}protocatechuyl alcohol can be accomplished catalytically with hydrogen in the presence of a noble metal catalyst, e.g., preferably palladium-on-charcoal, platinum-on-charcoal, and the like. Alternatively, reduction of the carbonyl group to a secondary alcohol group can be accomplished electrolytically or chemically (e.g., using sodium and alcohol, or a metallic hydride such as lithium aluminum hydride or sodium borohydride) followed by debenzylation by means of catalytic hydrogenolysis in the presence of a noble metal catalyst of the kind indicated.

Illustratively, reduction and debenzylation of α-[2-(1-alkyleneimino)ethylamino] - 3,4 - dibenzyloxyalkanophenone dihydrochloride is accomplished by dissolving in a solvent such as water or a lower alkanol, e.g., methanol, ethanol, propanol, and the like, adding catalyst, introducing hydrogen, and agitating the reaction mixture until hydrogen absorption ceases. The resulting α-{1-[2-(1-alkyleneimino)ethylamino]alkyl}protocatechuyl alcohol dihydrochloride is recovered in conventional manner, such as by removing the catalyst, evaporating the solvent, and purifying the product if so desired, e.g., by recrystallization.

In an alternative preparation of the compounds of the invention (Formula I, above), 3,4-dihydroxy-α-chloroalkanophenone is prepared by condensing catechol according to well-known procedures with an α-chloroalkanoyl halide, e.g., chloroacetyl chloride, α-chloropropionyl chloride, α-chlorobutyryl chloride, α-chlorovaleryl chloride, and the like. The 3,4-dihydroxy-α-chloroalkanophenone thus obtained is then reacted with 2-(1-alkyleneimino)ethylamine under the conditions outlined above to form α-[2 - (1-alkyleneimino)ethylamino]-3,4-dihydroxyalkanophenone; an acid-addition salt is prepared, and reduction is carried out catalytically, electrolytically, or chemically as described above, to obtain the desired α-{1-[2 - (1 - alkyleneimino)ethylamino]alkyl}protocatechuyl alcohol acid adidtion salt.

Acid addition salts of the α-{1-[2-(1-alkyleneimino) ethylamino]alkyl}protocatechuyl alcohols of the invention (Formula I above) are preferably obtained from the corresponding acid addition salts of the α-[2-(1-alkyleneimino)ethylamino] - 3,4-dibenzyloxy (or dihydroxy)alkanophenones of the invention, according to the process described above. The acid addition salts of the α-[2-(1-alkyleneimino)ethylamino] - 3,4 - dibenzyloxy (or dihydroxy)alkanophenone intermediates are prepared by reaction with a desired acid, illustratively, a desired pharmacologically acceptable organic or inorganic acid, for example, hydrochloric, hydrobromic, sulfuric, phosphoric, tartaric, citric, acetic, butyric, succinic, quinic, and like acids.

When used in pharmaceutical formulations, the novel α - {1 - [2 - (1-alkyleneimino)ethylamino]alkyl}protocatechuyl alcohols of the invention (Formula I above) are preferably employed in the form of pharmacologically acceptable acid addition salts. Thus, a salt can be combined with solid or liquid pharmaceutical carriers and formulated in the form of tablets, powder packets, or capsules, using starch and like excipients, or dissolved or suspended in suitable solvents or vehicles, for oral or parenteral administration.

Further, the α-{1-[2-(1-alkyleneimino)ethylamino]-alkyl}protocatechuyl alcohols and α-[2-(1-alkyleneimino)-ethylamino]alkanophenones of the invention are useful, in accordance with U.S. Patents 1,915,334 and 2,075,359, in preparing amine fluosilicate mothproofing agents and, in accordance with U.S. Patents 2,425,320 and 2,606,155, in preparing amine thiocyanate-formaldehyde condensation products for use as pickling inhibitors.

The following examples are illustrative of the process and products of the present invention, but are not to be construed as limiting.

EXAMPLE 1

*Preparation of α-{1-[2-(1-Pyrrolidinyl)Ethylamino]-Ethyl}Protocatechuyl Alcohol Dihydrochloride*

PART A

*Preparation of α-[2-(1-Pyrrolidinyl)Ethylamino]-3,4-Dibenzyloxypropiophenone Dihydrochloride*

A 2-liter, 3-necked flask was fitted with a stirrer, reflux condenser, and dropping funnel. A quantity, 212.7 g. (0.5 mole), of 3,4-dibenzyloxy-α-bromopropiophenone dissolved in 800 ml. of benzene was introduced and stirred. To the stirred solution was added, dropwise during an interval of 30 minutes, 114.2 g. (1.0 mole) of 2-(1-pyrrolidinyl)ethylamine. The reaction mixture was stirred for 3 hours more at about 25° C., and then filtered with suction. Benzene (50 ml.) was washed over the filter cake into the filtrate. The resulting benzene solution was introduced into a 2-liter, 3-necked flask fitted as above and the solution was cooled to 10° C. Ethanolic hydrogen chloride, prepared by dissolving 55 g. of gaseous hydrogen chloride in 200 ml. of ethanol cooled in an ice-bath, was added dropwise with stirring to the cooled benzene solution, the temperature of the reaction mixture being maintained at about 10° C. during the addition. The resulting solid was recovered on a filter, washed with 500 ml. of ethanol and 250 ml. of ether, and dried, yielding 138 g. (52%) of α-[2-(1-pyrrolidinyl)ethylamino]-3,4-dibenzyloxypropiophenone dihydrochloride having a melting point of 215° to 217° C.

*Analysis.*—Calculated for $C_{29}H_{36}Cl_2N_2O_3$: C, 65.54; H, 6.83; N, 5.27; Cl, 13.34. Found: C, 65.77; H, 6.68; N, 5.54; Cl, 13.09.

Following the same procedure but substituting 3,4-dibenzyloxy-α-chloropropylophenone for 3,4-dibenzyloxy-α-bromopropiophenone, the same α-[2-(1-pyrrolidinyl)-ethylamino]-3,4-dibenzyloxypropiophenone dihydrochloride was prepared.

PART B

*Preparation of α-{1-[2-(1-Pyrrolidinyl)Ethylamino]-Ethyl}Protocatechuyl Alcohol Dihydrochloride*

A mixture consisting of 53.15 g. (0.1 mole) of α-[2-(1-pyrrolidinyl)ethylamino] - 3,4 -dibenzyloxypropiophenone dihydrochloride, 3.0 g. of 10 percent palladium-on-charcoal catalyst, 200 ml. of water, and 0.25 ml. of hydrochloric acid (37% concentration) in a Parr hydrogenation apparatus was shaken with hydrogen at a pressure of 50 p.s.i. at about 25° C. until hydrogen absorption ceased. The mixture was filtered with suction, and the filtrate was concentrated under reduced pressure at 60° C. on a water bath. The viscous gum thus obtained was dissolved in just enough boiling ethanol to complete solution. This solution was chilled to 5° C. and held overnight at that temperature to effect crystallization. The resulting crystalline α-{1-[2-(1-pyrrolidinyl)ethylamino]-ethyl}protocatechuyl alcohol dihydrochloride was recovered by filtration and was dried under reduced pressure at about 25° C. The compound melted at 194° to 195° C. and gave the following analysis:

Calculated for $C_{15}H_{26}Cl_2N_2O_3$: C, 50.99; H, 7.42; N, 7.93; Cl, 20.07. Found: C, 51.01; H, 7.26; N, 8.04; Cl, 20.04.

EXAMPLE 2

*Preparation of α-{[2-(1-Pyrrolidinyl)Ethylamino]Methyl} Protocatechuyl Alcohol Dihydrochloride*

PART A

*Preparation of α-[2-(1-Pyrrolidinyl)Ethylamino]-3,4 Dihydroxyacetophenone Dihydrochloride*

A 500 ml. 3-necked, round-bottom flask was fitted with a stirrer, dropping funnel, and reflux condenser. A quantity, 11.4 g. (0.1 mole), of 2-(1-pyrrolidinyl)ethylamine was added, dropwise, to a stirred slurry of 18.6 g. (0.1 mole) of 3,4-dihydroxy-α-chloroacetophenone, 150 ml. of isopropanol, and 12 g. (0.11 mole) of sodium carbonate. The reaction mixture was heated under reflux for 1 hour, and while still warm was filtered with suction. The filter cake was washed with 100 ml. of isopropanol. The combined filtrate and washings were acidified with ethanolic hydrogen chloride, prepared by dissolving 11 g. of gaseous hydrogen chloride in 40 ml. of ethanol cooled in an ice-bath. After cooling the mixture to about 25° C. the resulting solid α-[2-(1-pyrrolidinyl) ethylamino]-3,4-dihydroxyacetophenone dihydrochloride was recovered on a filter and dried under reduced pressure. The compound had a melting point of 242° to 244° C. (with decomposition).

*Analysis.*—Calculated for $C_{14}H_{22}Cl_2N_2O_3$: C, 49.86; H, 6.58; N, 8.31. Found: C, 49.87; H, 6.28; N, 8.54.

Following the same procedure but substituting for the ethanolic hydrogen chloride an ethanolic solution of hydrobromic, sulfuric, phosphoric, tartaric, citric, acetic, butyric, quinic, and succinic acids, the corresponding hydrobromide, sulfate, phosphate, tartrate, citrate, acetate, butyrate, quinate, and succinate acid addition salts of α-[2-(1 -pyrrolidinyl)ethylamino] - 3,4 - dihydroxyacetophenone were prepared.

PART B

*Preparation of α-{[2-(1-Pyrrolidinyl)Ethylamino]-Methyl}Protocatechuyl Alcohol Dihydrochloride*

A mixture consisting of 4.5 g. (0.013 mole) of α-[2-(1-pyrrolidinyl)ethylamino] - 3,4 - dihydroxyacetophenone dihydrochloride, 50 ml. of water, 0.1 ml. of hydrochloric acid (37% concentration), and 0.1 g. of 10 percent palladium-on-charcoal catalyst in a Parr hydrogenation apparatus was shaken with hydrogen at a pressure of 50 p.s.i. at about 25° C. After 2.5 hours 85 percent of the theoretical amount of hydrogen had been taken up. The mixture was filtered with suction, and the filtrate was evaporated to dryness under reduced pressure on a steam bath. The α-{[2-(1-pyrrolidinyl)ethylamino]methyl}protocatechuyl alcohol dihydrochloride thus obtained as a white solid was recrystallized from 185 ml. of 95 percent ethanol. The compound had a melting point of about 188° C. (with decomposition).

Following the same procedure but substituting the hydrobromide, sulfate, phosphate, tartrate, citrate, acetate, butyrate, quinate, and succinate acid addition salts of α-[2 - (1 - pyrrolidinyl)ethylamino - 3,4 - dihydroxyacetophenone for α-[2-(1-pyrrolidinyl)ethylamino]-3,4-dihydroxyacetophenone dihydrochloride, the corresponding hydrobromide, sulfate, phosphate, tartrate, citrate, acetate, butyrate, quinate, and succinate acid addition salts of α-{[2 - (1 - pyrrolidinyl)ethylamino]methyl}protocatechuyl alcohol were prepared.

EXAMPLE 3

*Preparation of α-{3-Methyl-1-[2-(1-Pyrrolidinyl)-Ethylamino]Butyl}Protocatechuyl Alcohol Dihydrochloride*

PART A

*Preparation of α-[2-(1-Pyrrolidinyl)Ethylamino]-3,4-Dibenzyloxy-γ-Methylvalerophenone Dihldrochloride*

Following the procedure of Example 1, Part A, but substituting 3,4-dibenzyloxy-α-bromo-γ-methylvalerophenone for 3,4-dibenzyloxy-α-bromopropiophenone, α-[2-(1-pyrrolidinyl)ethylamino] - 3,4 - dibenzyloxy - γ - methylvalerophenone dihydrochloride was prepared.

PART B

*Preparation of α-{3-Methyl-1-[2-(1-Pyrrolidinyl)-Ethylamino]Butyl}Protocatechuyl Alcohol Dihydrochloride*

Following the procedure of Example 1, Part B, but substituting α-[2-(1-pyrrolidinyl) ethylamino]-3,4-dibenzyloxy-γ-methylvalerophenone dihydrochloride for α-[2-(1-pyrrolidinyl)ethylamino] - 3,4 - dibenzyloxypropiophenone dihydrochloride, α-{3-methyl-1-[2-(1-pyrrolidinyl)ethylamino]butyl}protocatechuyl alcohol dihydrochloride was prepared.

EXAMPLE 4

*Preparation of α-{1-[2-(2,2-Dimethyl - 1 - Pyrollidinyl)-Ethylamino]Ethyl}Protocatechuyl Alcohol Dihydrochloride*

PART A

*Preparation of α-[2-(2,2-Dimethyl-1-Pyrrolidinyl)-Ethylamino]-3,4-Dibenzyloxypropiophenone Dihydrochloride*

Following the procedure of Example 1, Part A, but substituting 2-(2,2-dimethyl-1-pyrrolidinyl)ethylamine for 2-(1 - pyrrolidinyl)ethylamine, α - [2 - (2,2 -dimethyl - 1-pyrrolidinyl)ethylamino] - 3,4 - dibenzyloxypropiophenone dihydrochloride was prepared.

PART B

*Preparation of α-{1-[2-(2,2-Dimethyl-1-Pyrrolidinyl)-Ethylamino]Ethyl}Protocatechuyl Alcohol Dihydrochloride*

Following the procedure of Example 1, Part B, but substituting α - [2-(2,2 - dimethyl - 1 - pyrrolidinyl)ethylamino] - 3,4 - dibenzyloxypropiophenone dihydrochloride for α - [2 - (1 - pyrrolidinyl)ethylamino] - 3,4 - dibenzyloxypropiophenone dihydrochloride, α - {1 - [2 - (2,2 - dimethyl - 1 - pyrrolidinyl) - ethylamino]ethyl}protocatechuyl alcohol dihydrochloride was prepared.

EXAMPLE 5

*Preparation of α-[1 - (2 - Piperidinoethylamino) - Ethyl] Protocatechuyl Alcohol Dihydrochloride*

PART A

*Preparation of α-(2-Piperidinoethylamino)-3,4-Dibenzyloxypropiophenone Dihydrochloride*

Following the procedure of Example 1, Part A, but substituting 2-piperidinoethylamine for 2-(1-pyrrolidinyl)-ethylamine, α-(2-piperidinoethylamino)-3,4-dibenzyloxypropiophenone dihydrochloride was prepared.

PART B

*Preparation of α-[1-(2-Piperidinoethylamino)Ethyl]-Protocatechuyl Alcohol Dihydrochloride*

Following the procedure of Example 1, Part B, but substituting α-(2-piperidinoethylamino) - 3,4 - dibenzyloxypropiophenone dihydrochloride for α-[2-(-pyrrolylidinyl)-ethylamino]-3,4-dibenzyloxypropionphenone dihydrochloride, α-[1-(2-piperidinoethylamino)ethyl]protocatechuyl alcohol dihydrochloride was prepared.

EXAMPLE 6

*Preparation of α-{1-[2-(1-Hexamethyleneimino)-Ethylamino]Ethyl}Protocatechuyl Alcohol Dihydrochloride*

PART A

*Preparation of α-[2 - (1 - Hexamethyleneimino)-Ethylamino]-3,4-Dibenzyloxypropiophenone Dihydrochloride*

Following the procedure of Example 1, Part A, but substituting 2-(1-hexamethyleneimino)ethylamine for 2-(1-pyrrolidinyl)ethylamine, α - [2-(1-hexamethyleneimino)-ethylamino]-3,4-dibenzyloxypropiophenone dihydrochloride was prepared.

PART B

*Preparation of α-{1-[2-(1-Hexamethyleneimino)-Ethylamino]Ethyl}Protocatechuyl Alcohol Dihydrochloride*

Following the procedure of Example 1, Part B, but substituting α - [2-(1-hexamethyleneimino)ethylamino]-3,4-dibenzyloxypropiophenone dihydrochloride for a α-[2-(1-pyrrolidinyl)ethylamino] - 3,4-dibenzyloxypropiophenone dihydrochloride, α - {1-[2-(1-hexamethyleneimino)ethylamino]ethyl}protocatechuyl alcohol dihydrochloride was prepared.

EXAMPLE 7

Ten thousand (10,000) scored tablets for oral use, each containing 50 mg. of α-{1-[2-(1-pyrrolidinyl)ethylamino]ethyl}protocatechuyl alcohol dihydrochloride, are prepared from the following types and amounts of ingredients:

| | Grams |
|---|---|
| α - {1 - [2 - (1-pyrrolidinyl)ethylamino]ethyl}protocatechuyl alcohol dihydrochloride | 500 |
| Starch U.S.P. | 170 |
| Talc U.S.P. | 130 |
| Lactose U.S.P. | 2600 |
| Sucrose powder U.S.P. | 37 |
| Ascorbic acid | 100 |
| Calcium stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets, which are administered at the rate of 1 to 2 tablets 1 to 4 times a day for the prevention of premature labor.

We claim:

1. Compound selected from the group consisting of (1) α - {1 - [2-(1-alkyleneimino)ethylamino]alkyl}protocatechuyl alcohol represented by the following structural formula

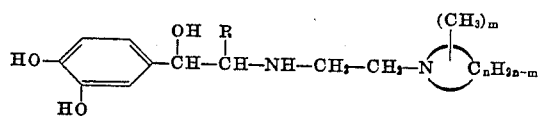

wherein R is selected from the group consisting of hydrogen and lower-alkyl of from 1 to 4 carbon atoms, inclusive, $n$ is an integer from 4 to 6, inclusive, and $m$ is an integer from 0 to 2, inclusive; and (2) acid addition salts thereof.

2. α-{1-[2-(1-pyrrolidinyl)ethylamino]ethyl}protocatechuyl alcohol dihydrochloride.

3. α-{[2-(1-pyrrolidinyl)ethylamino]methyl}protocatechuyl alcohol dihydrochloride.

4. Compound selected from the group consisting of (1) α-[2-(1-alkyleneimino)ethylamino]alkanophenone represented by the following structural formula

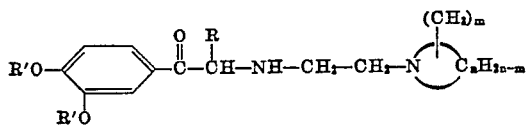

wherein R is selected from the group consisting of hydrogen and lower-alkyl of from 1 to 4 carbon atoms, inclusive, R' is selected from the group consisting of hydrogen and benzyl, n is an integer from 4 to 6, inclusive, and m is an integer from 0 to 2, inclusive; and (2) acid addition salts thereof.

5. α-[2-(1-pyrrolidinyl)ethylamino]-3,4-dibenzyloxypropiophenone dihydrochloride.

6. α-[2-(1-pyrrolidinyl)ethylamino]-3,4-dihydroxyacetophenone dihydrochloride.

7. α-{1-[2-(1-pyrrolidinyl)ethylamino]alkyl}protocatechuyl alcohol acid addition salt according to claim 1.

8. α-[2-(1-pyrrolidinyl)ethylamino]-3,4-dibenzyloxyalkanophenone acid addition salt according to claim 4.

9. α-[2-(1-pyrrolidinyl)ethylamino]-3,4-dihydroxyalkanophenone acid addition salt according to claim 4.

References Cited in the file of this patent

UNITED STATES PATENTS 2,431,285    Suter et al. -------------- Nov. 18, 1947
2,864,825    Heinzelman et al. -------- Dec. 16, 1958

OTHER REFERENCES

Langecker et al.: Naunyn Schmiedebergs Arch. Exptl. Pathol, Pharmakol, vol. 226, pages 493–504 (1955).